H. M. KLINGENFELD.
REFRIGERATING APPARATUS.
APPLICATION FILED MAY 26, 1916.
1,246,280.
Patented Nov. 13, 1917.
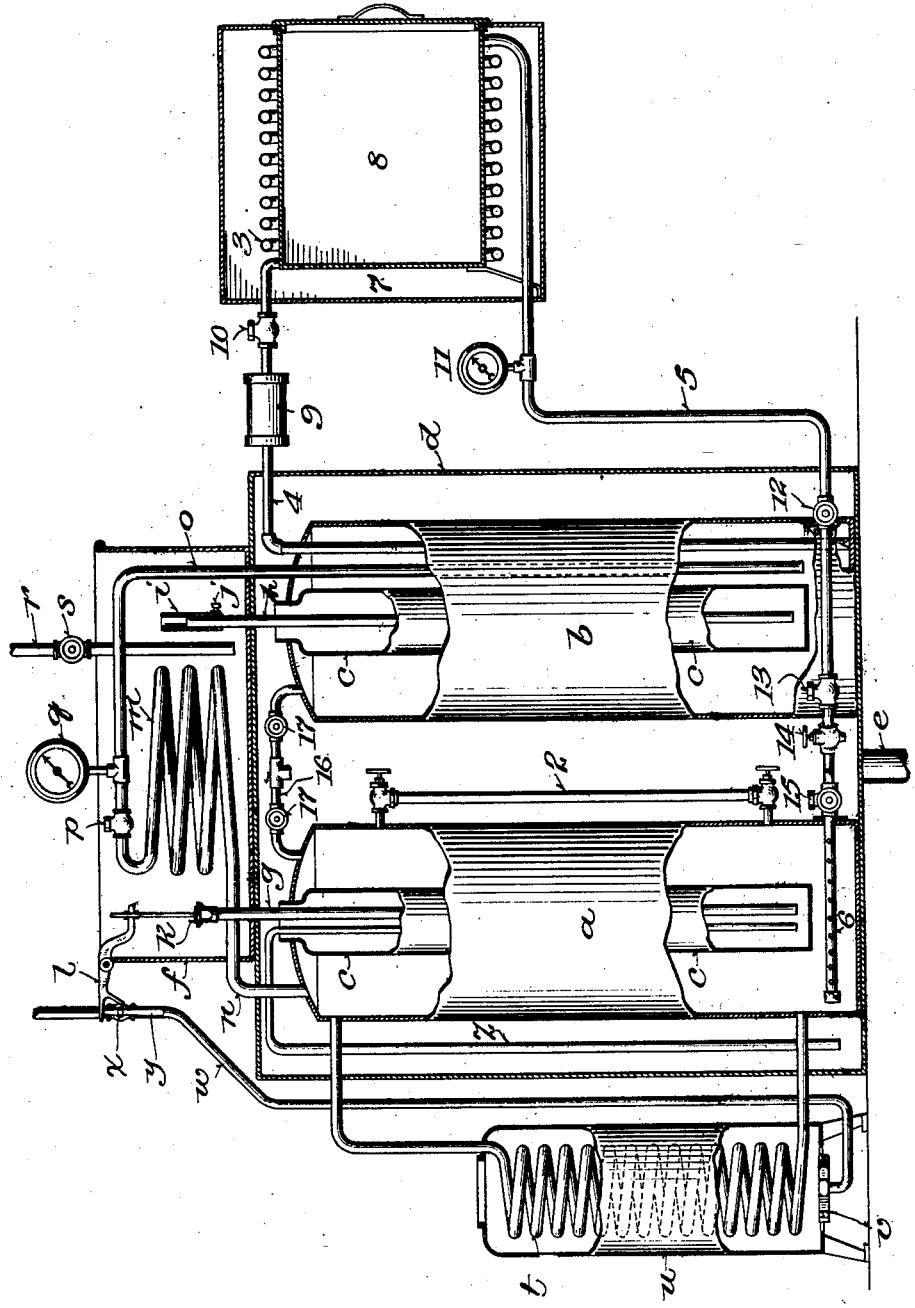
Inventor:
Harry M. Klingenfeld
By Flanders, Bottum, Fowsett & Bottum
Attorneys.

UNITED STATES PATENT OFFICE.

HARRY M. KLINGENFELD, OF MILWAUKEE, WISCONSIN.

REFRIGERATING APPARATUS.

1,246,280.      Specification of Letters Patent.      Patented Nov. 13, 1917.

Application filed May 26, 1916. Serial No. 99,936.

*To all whom it may concern:*

Be it known that I, HARRY M. KLINGENFELD, a citizen of the United States, residing at Milwaukee, in the county of Milwaukee and State of Wisconsin, have invented certain new and useful Improvements in Refrigerating Apparatus, of which the following is a specification, reference being had to the accompanying drawing, forming a part thereof.

This invention relates more particularly to an absorption system in which a refrigerating agent such as ammonia is successively evaporated and separated from an absorbent such as water, by the application of heat, condensed by a cooling agent and expanded to produce a cooling effect.

Its main objects are to shorten the evaporating period and prolong the absorption period of the cycle of operations; to reduce the quantity of fuel and water or other cooling agent required to evaporate and separate the refrigerating agent from the solution and to condense the refrigerating agent after it is separated from the solution, and generally to simplify and improve the construction and operation of apparatus of this class particularly for domestic purposes and small commercial plants.

The invention consists in the peculiar construction, arrangement and combination of parts as hereinafter particularly described and pointed out in the claims.

The accompanying drawing illustrates partly in side elevation and partly in vertical section, apparatus embodying the invention.

The apparatus comprises a closed ammonia generating and absorbing tank or generator absorber $a$, and a closed condensing tank or condenser $b$, which are preferably made of metal and may be like or similar in construction to an ordinary domestic boiler for heating water. Each tank is provided with an internal cooling chamber $c$, preferably of cylindrical form and attached at or adjacent to its upper end, which may be contracted as shown, by a fluid tight joint to the upper end or head of the tank. The cooling chamber, which extends from the upper head nearly to the bottom of the tank and is preferably coaxial therewith, is closed at the lower end and has an overflow opening at the upper end, arranged to discharge the cooling agent such as water, with which it is supplied, over the exterior surface of the tank.

The tanks are arranged in an upright position near each other, and are preferably inclosed in a casing $d$, the lower part of which forms an overflow receptacle or catch basin, and is provided at the bottom with a drain pipe $e$. This casing is provided with a door or removable section affording access to the tanks and their connections.

A tank or reservoir $f$, for water or other cooling agent, with which the chambers $c$ are supplied, is mounted on the casing $d$ or otherwise supported above the tanks $a$ and $b$, and is connected with said chambers by pipes $g$ and $h$, extending downwardly nearly to the lower ends of said chambers. The intake opening at the upper end of the pipe $g$, which is provided with a valve seat, is at a lower level than the intake opening at the upper end of the pipe $h$. The pipe $h$ is provided at its upper end, which extends into the reservoir $f$ above the upper end of the pipe $g$, with a vertically adjustable sleeve $i$, secured thereto by a set screw $j$, and forming a vertically adjustable overflow from said reservoir whereby the liquid level therein may be varied, for a purpose hereinafter explained. The upper end of the pipe $g$ is provided with a valve $k$, which controls the supply of water or other cooling agent to the internal cooling chamber $c$ of the tank $a$. The valve $k$ is operated by a lever $l$, fulcrumed on the upper part of the reservoir $f$ and having a forked arm extending outwardly therefrom.

A dehydrating or condensing and separating coil $m$ contained in the reservoir $f$ is connected at its lower intake end by a pipe $n$ with the upper part of the tank $a$, and at its upper outlet end by a pipe $o$ with the lower part of the tank $b$. The pipe $o$ is provided with a check valve $p$, which closes toward the coil $m$, and between the check valve and tank $b$ with a high pressure gage $q$.

A pipe $r$, provided with a valve $s$, leads into the reservoir $f$, for supplying water or other cooling fluid thereto.

An evaporating coil $t$, preferably located outside of the casing $d$, is connected at one end with the lower part of the tank $a$ and at the other end with the pipe $n$ through the upper part of said tank above the liquid level therein, or it may be connected with the pipe $n$ above said tank. This evaporating coil, which is preferably inclosed by a casing $u$, may be heated by steam when it is available, or by other means such as a gas burner $v$, supplied with gas by a pipe $w$, provided with a valve $x$. The handle $y$ of the valve $x$ has an arm or projection arranged to engage with the forked arm of the lever $l$, so that when the gas valve is opened as shown in the drawing, the valve $k$ will be closed, and when the gas valve is closed, the valve $k$ will be opened, without care or attention.

Where steam is available for evaporating the contents of the tank $a$, a steam coil may be placed inside of the tank, but an evaporating coil and means for heating the same located outside of the generator absorber $a$, as shown by the drawing, are preferable.

The cooling chamber $c$ of the generator absorber $a$ is provided with a drain or outlet connection for emptying it. This may be of smaller capacity than the supply pipe or connection $g$, and left constantly open so that it will require no attention. A siphon $z$ is shown for this purpose, having its inner leg within the chamber $c$, of smaller diameter or capacity than the pipe $g$.

The generator absorber is provided with a gage 2, for indicating the liquid level therein. An expansion coil 3 is connected by a pipe 4, the lower part of the condenser $b$ and by a return pipe 5, with the generator absorber $a$ through a perforated pipe 6, extending into and across the generator absorber tank near the bottom. The expansion coil is preferably immersed in brine or a suitable solution such as calcium chlorid, contained in a receptacle 7, surrounding a freezing or cooling chamber 8, of any suitable construction, according to the use which is to be made of it.

A filter or scale trap 9, of any suitable construction, is preferably placed in the pipe 4 leading to the expansion coil, to remove any impurities or foreign matter from the refrigerating agent which may be carried over with it from the condenser. The pipe 4 is also provided with an expansion or cut off valve 10, having a restricted expansion orifice of predetermined area for controlling the supply of refrigerant from the condenser to the expansion coil. The return pipe 5 is provided with a low pressure gage 11, a shut-off valve 12, a check valve 13 closing toward the expansion coil (although this may be omitted), a drain cock 14 and a three-way valve 15 having a hose or pipe coupling for charging the generator absorber and for disconnecting it from the expansion coil.

A vent pipe 16, provided with cocks 17, is connected with the upper ends of the tanks $a$ and $b$ for releasing air or foreign gases which may be trapped therein.

Any suitable refrigerant may be used in the apparatus, such as anhydrous ammonia, which is readily soluble in water.

The apparatus with ammonia as a refrigerant, operates as follows:

The generator absorber $a$ being charged with a strong aqueous solution of ammonia to about the level of the top of the gage 2, and the reservoir $f$ supplied with water through the pipe $r$, the gas valve or cock $x$ is opened, as shown in the drawing, and the burner $v$ lighted. The valve $k$ being closed by the opening of the gas valve $x$, and the cooling chamber $c$ of the tank $a$ being empty, the aqueous solution drawn from the lower part of the generator-absorber $a$ is heated in the coil $t$, and because of the unstable chemical character of the aqua ammonia, the ammonia, whose boiling point is lower than that of the water, is rapidly vaporized and conducted therefrom through the coil $m$, which is immersed in the cooling water contained in the reservoir $f$ to the level of the overflow opening at the upper end of the sleeve $i$, through which it overflows into the pipe $h$ and thence into the lower end of the cooling chamber $c$, in the condenser $b$. Aqueous vapor carried off with the ammonia vapor or gas from the heating coil $t$, is condensed in the coil $m$, and flows back through the pipe $n$ into the generator-absorber. The dehydrated ammonia vapor or gas passes through the check valve $p$ and pipe $o$ into the lower part of the condenser $b$, where it is condensed and liquefied by the cooling water with which the chamber $c$ is filled, and which overflows from the upper end thereof over the exterior surface of the condenser $b$ into the basin or receptacle formed by the lower part of the casing $d$, passing off through the drain pipe or connection $e$. Only a comparatively small portion of the total volume of the aqueous solution of ammonia being subjected to heat at any given time in the coil $t$ into which it flows from the lower part of the generator-absorber, evaporation and separation of the ammonia from the water is effected gradually and continuously in a much shorter time and with the consumption of much less gas or fuel than would be required to evaporate and separate the ammonia from the solution by the direct application of heat to the entire volume contained in the generator-absorber $a$. The evaporation period is thus materially shortened, and the consumption of gas or fuel materially reduced.

The application of the water or cooling agent both internally and externally to the condenser during the evaporation period, as shown and described, expedites the condensation of the ammonia gas in the tank $b$, and materially reduces the quantity of water required for this purpose during the evaporation period.

After a suitable portion of the ammonia in the solution contained in generator-absorber $a$ has thus been evaporated, which is accomplished in a comparatively short time, and is indicated by the liquid level in the gage 2, the gas valve $x$ is closed, thereby opening the valve $k$, which admits cooling water from the reservoir $f$ into the chamber $c$ of generator-absorber $a$. The water filling said chamber and overflowing from the upper end thereof in a thin film over the exterior surface of the generator-absorber, quickly cools the weak solution or liquid remaining therein, and reabsorption of the ammonia gas admitted thereto through the pipes 5 and 6 from the expansion coil 3 begins, and actively continues for a comparatively long period until the temperature and pressure of the expanding ammonia become too high, as indicated by the gage 11, for efficient work.

From the condenser, the ammonia, which is held under pressure in a liquid state therein, is supplied through the pipe 4, filter 9 and expansion valve 10, to the coil 3, in which it expands, cooling the brine or other solution in which it is immersed and the chamber 8 surrounded by the coil.

The valve 10 may be automatically closed and opened in a well known manner by a thermostatic controlling mechanism, according to variations of temperature in the brine or solution contained in the chamber 7, or variations in the temperature of the air in the refrigerating or cooling chamber 8.

The spent ammonia gas, after expansion in the coil 3, is conducted under low pressure indicated by the gage 11, through the pipes 5 and 6, into the generator-absorber $a$, where it is reabsorbed by the water or weak solution contained therein.

During the comparatively long expansion and absorption period of the cycle, the valve $k$ being open, the cooling water descends in the reservoir $f$ below the overflow opening into the sleeve $i$ and pipe $h$, and is directed through the cooling chamber $c$ of the generator-absorber $a$, overflowing at the upper end of the chamber in a thin film over the exterior surface of the generator-absorber, keeping the solution contained therein cool and in condition for continuous and active absorption of the ammonia gas. During this period the cooling water is not needed for the condenser $b$ and dehydrating coil $m$, and economy in the use of water is thus automatically effected. During the short period of evaporation and separation of the ammonia from the solution, when cooling water is not required for the absorption, but is required for the condenser and the generator-coil $m$, it is cut off from the generator-absorber by closing the valve $k$, and rising in the reservoir $f$ around the coil $m$, preliminarily cools and condenses the aqueous vapor entering said coil, and then overflows through the sleeve and pipe $h$ into the cooling chamber $c$ of the condenser and over the exterior surface of the condenser $b$, condensing and liquefying the ammonia discharged into said condenser under the pressure produced by evaporation in the coil $t$.

As soon as the valve $k$ is closed and the cooling water cut off from the generator-absorber, the cooling chamber $c$ of the generator-absorber is automatically emptied by the action of the siphon $z$.

By adjusting the sleeve $i$ up or down when the valve $k$ is closed, the level of the cooling water in the reservoir $f$ around the coil $m$ is raised or lowered, according to the temperature of the water supplied to the reservoir and the condensing effect required in said coil.

The term "coil" is used herein in a generic sense and is intended to include a single pipe or chamber of any suitable size and shape or a group of such pipes or chambers.

Various modifications in the construction and arrangement of parts of the apparatus in the adaptation of the same to varying conditions and different uses may be made without departure from the principle and scope of the invention as defined in the following claims.

I claim:

1. In refrigerating apparatus the combination of a closed generator-absorber provided with an interior cooling chamber having an overflow opening arranged to discharge a cooling agent over the exterior of the generator-absorber, a supply connection for the cooling agent leading into said chamber and provided with a valve for shutting off the supply of cooling agent thereto, and a restricted outlet from the lower part of said chamber for emptying the same when the supply of cooling agent is shut off.

2. In refrigerating apparatus the combination of a closed generator-absorber provided with an interior cooling chamber having an overflow opening arranged to discharge a cooling agent over the exterior of the generator-absorber, a connection provided with a valve for supplying said chamber with the cooling agent, and a siphon adapted to empty said chamber when the valve in the supply connection is closed.

3. In refrigerating apparatus the combination of a closed generator-absorber provided with an interior cooling chamber having an overflow opening arranged to discharge a cooling agent over the exterior of the generator-absorber, a reservoir for the cooling agent located above the generator-absorber, and having a connection leading into said cooling chamber and provided with a valve, a dehydrating coil in said reservoir having a drain connection leading into the generator-absorber, an evaporating coil connected with the lower part of the generator-absorber and with the dehydrating coil, means for heating said evaporating coil comprising a heating agent supply connection provided with a valve and a connection between the heat controlling valve and the valve controlling the supply of cooling agent to said cooling chamber whereby the opening of one valve closes the other.

4. In refrigerating apparatus the combination of a closed generating and absorbing tank and a closed condensing tank, each provided with an inner cooling chamber having an overflow opening arranged to discharge a cooling agent over the exterior of the tank, a reservoir for the cooling agent located above said tanks and connected by conduits with the cooling chambers, the opening into the conduit leading into the cooling chamber of the generating and absorbing tank being at a lower level than the opening into the other conduit, a dehydrating coil in said reservoir connected with the generating and absorbing tank, and means for evaporating the contents of the generating and absorbing tank.

5. In refrigerating apparatus the combination of a generating and an absorbing tank, a condensing tank provided with a cooling chamber, a water reservoir located above said tanks and having a water supply connection and a vertically adjustable outlet leading into said chamber, a dehydrating coil connected with the condensing tank and at its lower end with the generating and absorbing tank, and a heater for evaporating the contents of the generating and absorbing tank.

6. In refrigerating apparatus the combination of a closed generating and absorbing tank provided with an internal cooling chamber having an overflow opening arranged to discharge a cooling agent over the exterior of the tank, a connection provided with a valve for supplying the cooling agent to said chamber, an evaporating coil having its inlet connected with the lower part of said tank and its outlet above the liquid level therein, a burner for heating said coil having a fuel supply connection provided with a valve and a connection between said valves whereby the opening of the fuel valve closes the other valve and the closing of the fuel valve opens the other valve.

7. In refrigerating apparatus the combination of an overflow receptacle provided with a drain connection, a closed generating and absorbing tank and a closed condensing tank placed in said receptacle and each provided with an internal cooling chamber having an overflow opening arranged to discharge over the exterior surface of the tank, connections for supplying a cooling agent to said chambers, means for controlling the supply of the cooling agent to the cooling chamber of the generating and absorbing tank, and means for emptying said chamber.

8. In refrigerating apparatus the combination of an overflow receptacle, a generating and absorbing tank and a condensing tank placed in said receptacle and each provided with an internal cooling chamber having an overflow opening arranged to discharge over the exterior surface of the tank, a water reservoir located above said tanks and having connections with their cooling chambers, the connection with the cooling chamber of the generating and absorbing tank having a valve and its inlet being at a lower level than the inlet of the other connection, a dehydrating coil contained in said reservoir and connected at its lower end with the generating and absorbing tank and at its upper end with the condensing tank, the connection with the condensing tank having a check valve closing toward the coil, means for evaporating the contents of the generating and absorbing tank, and an expansion coil having an inlet connection with the lower part of the condensing tank and an outlet connection with the generating and absorbing tank, the inlet connection having a restricted expansion opening and an outlet connection having a check valve closing toward said coil.

9. In refrigerating apparatus the combination of a closed generating and absorbing tank and a condensing tank provided with cooling chambers, a cooling agent reservoir located above said tanks and having delivery connections leading into said cooling chambers, means for shutting off the supply of cooling agent from said reservoir to the cooling chamber of the generating and absorbing tank, a dehydrating coil having connections leading from the lower and upper parts thereof into the generating and absorbing and condensing tanks respectively, a check valve in the connection between said coil and the condensing tank to prevent back flow of the refrigerating agent, and a heater comprising an evaporating coil connected with the generating and absorbing tank at different levels.

10. In refrigerating apparatus the combination of a closed generator-absorber and a closed condenser provided with valve controlled vents opening from the upper parts thereof, means for alternately heating and cooling the liquid in the generator-absorber, means for cooling the condenser, a condensing and separating coil connected at the lower end with the generator-absorber and at the upper end with the condenser, a check valve closing toward said coil in the connection between it and the condenser, and an expansion coil having an inlet connection with the lower part of the condenser and an outlet connection with the lower part of the generator-absorber.

In witness whereof I hereto affix my signature in presence of two witnesses.

HARRY M. KLINGENFELD.

Witnesses:
 CHAS. L. GOSS,
 ALICE E. GOSS.